United States Patent [19]

Engel et al.

[11] Patent Number: 4,860,293

[45] Date of Patent: Aug. 22, 1989

[54] SUPERVISION CIRCUIT FOR A NON-ENCODED BINARY BIT STREAM

[75] Inventors: Ludovicus H. M. Engel; Pieter C. Pieket Weeserik, both of Hilversum, Netherlands

[73] Assignee: U.S. Philips Corp., New York, N.Y.

[21] Appl. No.: 926,476

[22] Filed: Nov. 3, 1986

[30] Foreign Application Priority Data

Nov. 26, 1985 [NL] Netherlands ................. 8503250

[51] Int. Cl.⁴ .............................................. G06F 11/00
[52] U.S. Cl. ...................................................... 371/51
[58] Field of Search ... 364/200 MS File, 900 MS File; 371/49, 71, 67, 51

[56] References Cited

U.S. PATENT DOCUMENTS

| | | | |
|---|---|---|---|
| 3,134,091 | 5/1964 | Shugart | 364/900 |
| 4,086,436 | 4/1978 | Cohen et al. | 370/102 |
| 4,175,287 | 11/1979 | Fuhrman | 364/900 |
| 4,314,355 | 2/1982 | Leighou et al. | 364/900 |
| 4,525,849 | 6/1985 | Wolf | 365/221 |
| 4,580,279 | 4/1986 | Kahn | 370/102 |
| 4,747,106 | 5/1988 | Wakimoto | 371/49 |

Primary Examiner—Gareth D. Shaw
Assistant Examiner—Debra A. Chin
Attorney, Agent, or Firm—Thomas A. Briody; Algy Tamoshunas; Leroy Eason

[57] ABSTRACT

An error supervision circuit for a non-encoded binary bit stream running through an elastic store comprising a memory having n locations, the bit rate of the stream supplied to the input of the memory differing from the bit rate of the stream produced at the output thereof. The successive bits in each group of n bits of the input stream are respectively written into the respective memory locations by write clock pulses supplied by a write register, at the input rate, and are successively read out from such locations by read clock pulses supplied by a read register at the output rate. The higher rate register is periodically interrupted for one or more bit periods to equalize filling and emptying of the memory. The bit streams at the input and output of the memory are supplied to respective data inputs of a comparator. A clock output of the lower rate register is connected to a first control input of the comparator to intermittently open a time window therein for receiving n bits of the lower rate bit stream. The corresponding clock output of the higher rate register is connected to a second control input of the comparator to intermittently open another time window therein for receiving n bits of the higher rate stream plus the number of bit periods during which the higher rate register has been interrupted. The comparator compares the bits in the two windows in regard to correspondence of the numbers of rising or falling edges or parity of the bits therein.

2 Claims, 2 Drawing Sheets

SUPERVISION CIRCUIT FOR A NON-ENCODED BINARY BIT STREAM

BACKGROUND OF THE INVENTION

1. Field of the Invention

The invention relates to a supervision circuit for a non-encoded binary bit stream conveyed through an elastic store having an input and an output, the rate at which the bit stream is applied to the input of the elastic store differing from the bit stream rate at the output of the elastic store, the latter comprising n locations, n bits of the binary bit stream always being written serially into the store by means of a write register and these n bits being read out serially by means of a read register, the register with the highest rate being stopped intermittently for one or more bit periods in order to equalize filling and emptying the elastic store. "Non-encoded" as used herein refers to absence of parity or other encoding for error detection.

2. Description of the Related Art

In PCM multiplex transmission systems an elastic store is comprised in the block converters, found at both the transmitting end and at the receiving end of the transmission system. At the transmitting end a bit stream is supplied to an elastic store which is preceded by a series arrangement formed by an equalizer, a regenerator and a decoder supplying a binary output signal. This binary output signal is applied to the input of the elastic store, and the binary output signal of the elastic store is applied to the multiplexer of the transmission system which multiplexes several such bit streams. At the receiving end, the binary signal originating from the demultiplexer corresponding to a given bit stream is applied to the input of an elastic store. The output signal of such elastic store is then applied to an encoder. Such a multiplex system is disclosed in Philips Telecommunications Review, vol. 38, no. 1, January 1980, pp. 11–22.

In the multiplex system described above the binary bit streams to be multiplexed, having slight mutual differences in frequency, are first brought to a common higher clock rate. This is realized by writing each one of these binary bit streams at its own clock rate into an elastic store and reading them from such store at a common higher clock rate. In order to prevent the elastic store from being emptied, the read clock is stopped periodically. Since there is a varying time relationship between the ingoing and outgoing binary bit streams of the elastic store, supervising the binary bit stream while being conveyed through the elastic store is not feasible by just comparing the binary input signal to the binary output signal. Besides, when passing through the elastic store, the binary bit stream is not encoded, and consequently it is not possible to make use of the redundancy provided in an encoded a bit stream, by detecting violations of the encoding rules.

SUMMARY OF THE INVENTION

The invention has for its object to provide a circuit for supervising a non-encoded binary bit stream passing through an elastic store. The invention is characterized in that the input and the output of the elastic store are connected to data inputs of a comparator. A clock output of the write register, acting as a control bit, is connected to a first control input of the comparator for opening at a specific repetition rate a write time window of n bits plus the number of bit periods during which, if it is the higher rate register the write register has been stopped. A clock output of the read register, corresponding with the aforesaid clock output of the write register, is connected to a second control input of the comparator for opening at the predetermined repetition rate a read time window of n bits plus if it is the higher rate register the number of bit periods during which the read register has been stopped. In in the comparator the read time window in regard to the number of rising or falling edges or parity of the bits therein is compared to the write time window.

BRIEF DESCRIPTION OF THE DRAWINGS

The invention will now be described by way of example with reference to the accompanying drawings.

DESCRIPTION OF THE PREFERRED EMBODIMENTS

Figure 1:
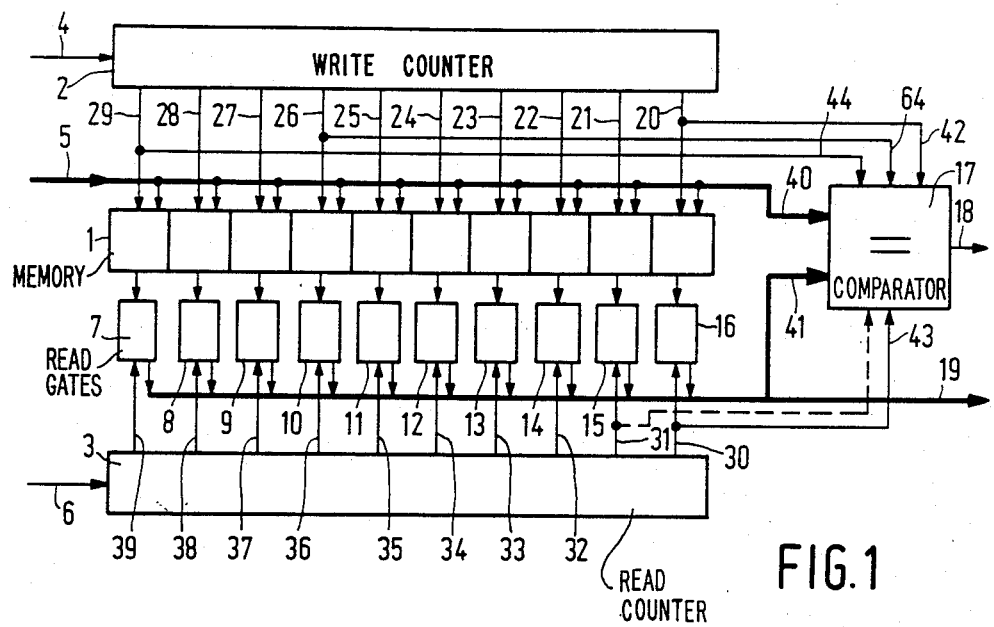
FIG. 1 shows in clock form a circuit in accordance with the invention.

In the embodiment as shown in FIG. 1, the elastic store comprises a memory 1 having 10 locations, a write counter 2 and a read counter 3. The data input line signals are fed to input 5 and the data output line signals are supplied from output 19. Write clock pulses, having for example a frequency of 139264 kHz, are applied to the clock input 4 of the write counter 2. Read clock pulses, having a higher frequency, for example 141248 kHz, are applied to the clock input 6 of the read counter 3. The clock outputs 20 to 29 of the write counter 2 are each connected to a clock input of a respective one of the locations of the memory 1. The data outputs of the locations of memory 1 are each connected to a data input of a respective one of the read gates 7 to 16. The clock outputs 30 to 39 of the read counter 3 are each connected to a clock input of a respective one of the read gates 7 to 16. The data outputs of the read gates 7 to 16 are connected to the data output line 19 of the elastic store. The data inputs of the locations in memory 1 are connected to the data input line 5. The latter is likewise connected to a first signal input 40 of a comparator circuit 17, whose second signal input 41 is connected to the data output line 19. The first clock output 20 of the write counter 2 is connected to a first control input 42 of the comparator circuit 17, whose second control input 43 is connected to the last clock output 31 of the read counter 3. The last clock output 29 of the write counter 2 is connected to a third control input 44 of the comparator circuit 17.

Figure 2:
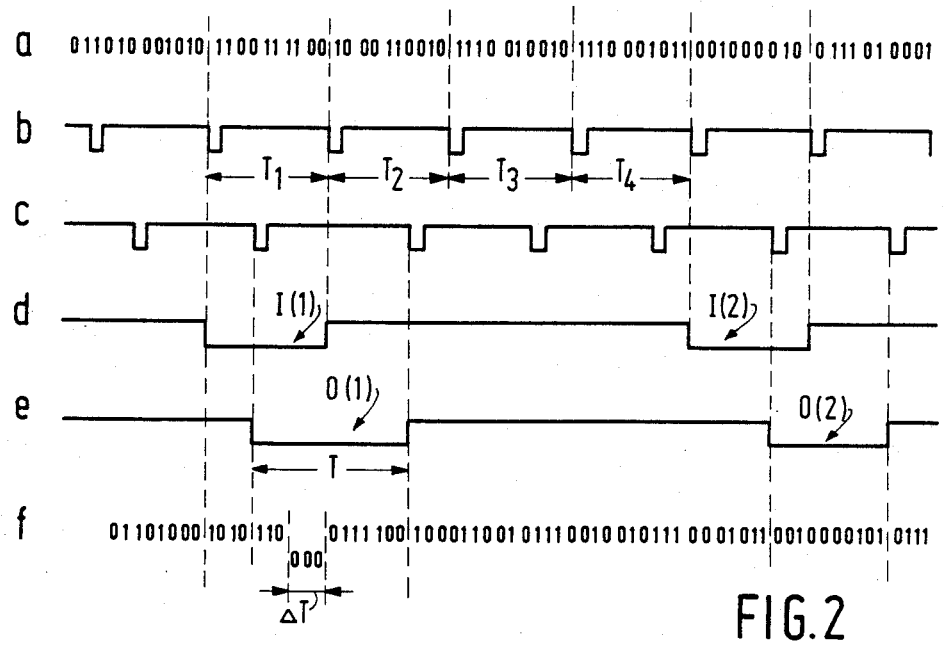
FIG. 2 shows time sequence rate diagrams to explain the operation of the circuit of FIG. 1.

The operation of the arrangement as shown in FIG. 1 will be described with reference to the time sequence diagrams of FIG. 2. FIG. 2a shows the incoming binary bit stream applied to input line 5, whilst FIG. 2f illustrates the outgoing binary bit stream supplied from output line 19. The write clock pulses are applied to the input 4 of the write counter 2. Their pulse repetition rate is, for example, 139264 kHz. At each clock output 20 to 29 of write counter 2 clock pulses are produced as illustrated in FIG. 2b, going in the direction from first clock output 20 towards last clock output 29, the pulses at successive outputs being shifted over a period of time equal to one data bit period. Therefore, by means of the clock pulses present at the clock outputs 20 to 29, the bits in each successive group of 10 data bits are written into the respectively memory locations in memory 1. Compare for example, the clock pulse time intervals $T_1$ to $T_4$ in FIG. 2b with the corresponding 10 data bits in a group as shown in FIG. 2a. For example, with the aid of the clock pulse present at first clock output 20, the first data bit, a logic 1 in the time interval $T_1$, is entered into the first location in memory 1. Subsequently, with the aid of the second clock pulse present at clock output 21, the second data bit, a logic 1 in the time interval $T_1$, is entered into the second location in memory 1, and so on. Finally, with the aid of the clock pulse present at clock output 29, the tenth data bit, a logic 0, is entered into the last location in memory 1.

The read clock pulses are applied to input 6 of the read counter. Their pulse repetition rate is, for example 141248 kHz. At each clock output 30 to 39, clock pulses are produced as illustrated in FIG. 2c, in the direction from first clock output 30 towards last clock output 39, the pulses at successive outputs being shifted over a period of time equal to one data bit period. The read rate of memory 1 being higher than its write rate, the read clock at the clock input 6 of the read counter 3 must periodically be interrupted for one or more data bit periods so as to prevent memory 1 from being emptied. This is shown (c) during FIG. 2 in the time interval T, where the read clock is stopped for $\Delta T$ = the period of time of three data bits, thereby extending the interval T by that amount as compared with the normal read interval. With the aid of the read clock pulses available at clock outputs 30 to 39 the ten locations of memory 1 are read-out. With the aid of the clock pulse available at first read clock output 30, the logic 1 stored in the first location of memory 1 is read-out via the read gate 16. Subsequently, with the aid of the clock pulse available at the next clock output 31 the logic 1, stored in the next location of memory 1, is read out via the read gate 15, and so on. Finally, with the aid of the clock pulse available at the last clock output 39 the logic 0, stored in the last location of memory 1 is read via read gate 7.

Thus, in the write time interval $T_1$ the data bit package 1100111100 is entered into memory 1, FIGS. 2a and 2b. In the read pulse time interval T this data package is read out, FIGS. 2c and 2f. The data package 1100000111100 will appear at the data output 19. The three overlined logic zeros have been added because the read clock has been stopped for a period of time equal to three data bits, as a precaution against memory 1 being emptied. Further down the system, management bits may be added to replace these three zeros.

With the aid of the clock pulses available at first clock output 20 of the write with register 2, controlling the first location of memory 1, a write time window I(1) is opened and closed, see FIG. 2d. This is done at a certain repetition rate. For the example stated above, the write time window I(1) is opened for the data write interval of 10 bits, and at a repetition rate of 40 bits. With the aid of the clock pulses available first clock output 30 of the read register 3, controlling the first location of the memory 1, a read time window O(1) is opened and closed, see FIG. 2e. This is done at the same repetition rate as for the write time window I(1). In the aforesaid example, the read time window O(1) is 13 bits long, the same as the corresponding read clock interval, and with a repetition rate of 40 bits. Subsequently, the bits in write time window I(1) are compared in comparator 18 to the bits in read time window O(1) as regards, for example, the number of bit edges or the parity of the data bits in both windows. In the prior art cited above, such a comparison of the parity is not possible, as the last bit is retained in the memory during the period of time that read clock is idle. In the above example this bit is a 0 not affecting the parity. However, if this last bit is a 1, the three overlined bits would also be a 1, so that the parity would indeed change. It is possible to have these bits always be 0, allowing of parity comparison. But then it should be noted that the read window during the interval T is three bit positions longer than the write time window as a consequence of the read register 3 being stopped for a time $\Delta T$=3 bit positions during the read clock interval T. During this $\Delta T$ stopping period, the data output 19 retains the logic value at the level it had reached just before the read register 3 was stopped. Thus, no extra edges are added to the output signal during the time $\Delta T$.

Figure 3:
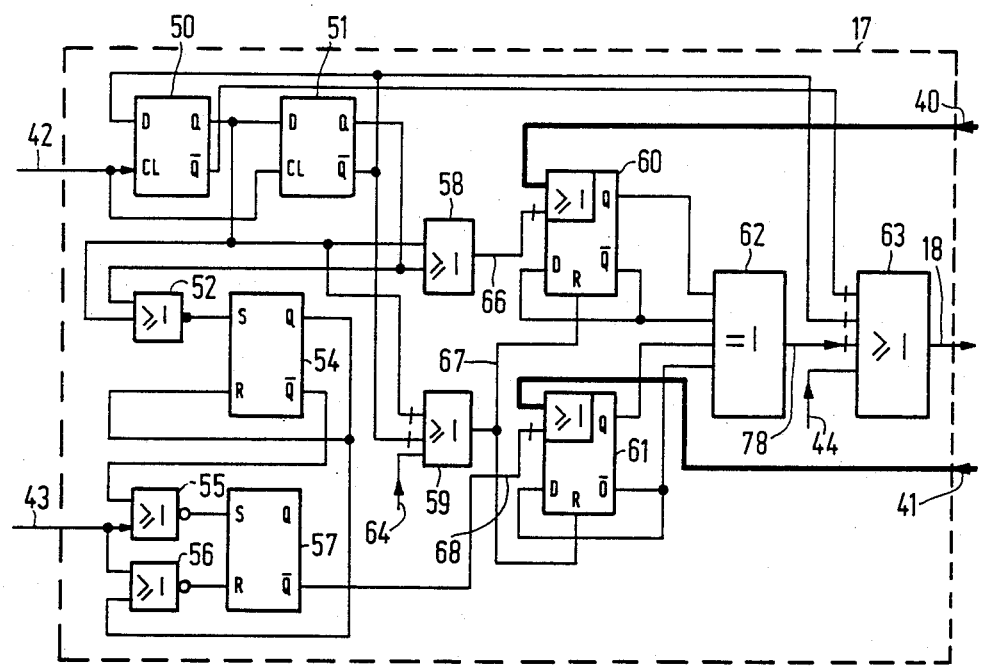
FIG. 3 shows a possible embodiment of a part of the circuit of FIG. 1.

FIG. 3 shows a possible arrangement of the comparator 17 of FIG. 1. The comparator 17 comprises the D-flipflops 50, 51, 60 and 61, the RS-flipflops 54 and 57 and the gates 52, 55, 56, 58, 59, 62 and 63, which have been interconnected in the manner shown in the diagram. It should be noted that a D-flipflop is characterized in that it is set, so Q=1, if a logic 0 is available at the D-input while a clock pulse is applied to the clock input CL; the flipflop is reset, so Q=0, if a logic 1 is available at the D-input of the flipflop while a clock pulse is applied to the clock input CL. The two flipsflops 50 and 51 are interconnected such that together they form a divide-by-4 divider. If clock pulses available at the clock output 20 of the write counter 2 are applied to input 42 of the comparator, four phase states will be developed. A first phase state $T_1$, where Q(50)=Q(51)=0, a second phase state $T_2$, where Q(50)=1, Q(51)=0, a third phase state $T_3$, where Q(50)=Q(51)=1 and a fourth phase state $T_4$, where Q(50)=0 and Q(51)=1, see FIG. 2b. The pulses Q(50) and Q(51) are applied to the inputs of the OR-gate 58. The output 66 of gate 58 is connected to the enable input of the flipflop 60. Not until the pulse signal applied to this enable input is low (=0) will the input data signal be transferred to the flipflop 60 via the line 40. However, the latter only takes place in phase state $T_1$. In the remaining phase states $T_2$, $T_3$ and $T_4$ the logic signal available at the output 66 of gate 58 is high (=1) and, consequently, the input data signal is blocked. In the first phase state $T_1$ the flipflop 60 will change in response to each descending edge in the input data signal. At the end of this phase state the Q-output of this flipflop 60 will assume a logic value of 1 or 0, depending on whether there is an odd or even number of descending edges available in the input data signal during this first phase state.

The flipflop 57 combined with the two NOR-gates 55 and 56 forms what is commonly referred to as a clocked RS-flipflop. The clock input is input 43 of the comparator 17. At the two inputs of the NOR-gate 52 two logic zeros are applied only for the duration of phase state $T_1$ of the input data time window I(1). Thus, only during this phase state there is a logic 1 at the set input S of flipflop 54, which is supplied to the reset input R of flipflop 54 and also to an input of gate 55. At the first clock pulse to be applied to input 43 of the comparator 17, the flipflop 57 will be set. A logic 0 appears at the $\overline{Q}$ output of flipflop 57, to be applied to the enable input 68 of the flipflop 61. Subsequently, the output data time window is opened and the output data signal is transferred to the flipflop 61 via line 41. After the input data time window has ended a logic 0 will appear at the set input S of flipflop 54. A logic 1 was available at the reset input R of the flipflop 54. Consequently, the flipflop 54 will be reset. The logic 0 present at the output Q thereof is applied to an input of gate 56. During the second clock pulse, which is applied to gate 56 via line 43, the flipflop 57 is reset. Consequently, the output data time window O(1) is closed and no output data is transferred any longer to flipflop 61. While the output data window is open, the flipflop 61 will change state in response to each descending edge in the output data signal. After the output data time window O(1) has closed, the Q output of flipflop 61 will assume a logic value 1 or 0, depending on whether there is an odd or even number of descending edges in the output data time window.

Figure 4:
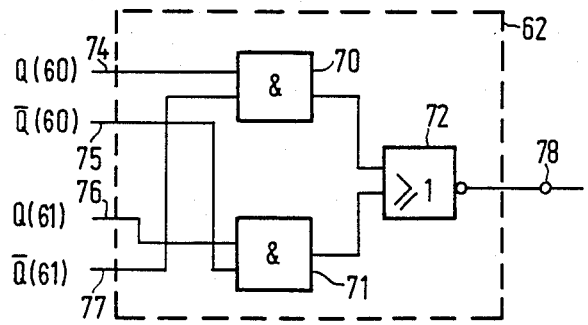
FIG. 4 shows the structure of the EX-OR gate 62 shown in FIG. 3.

The Q and $\overline{Q}$ outputs of the two flipflops 60 and 61 are each connected to inputs 74 to 77 of the exclusive-OR gate 62. The structure hereof is shown in FIG. 4. The inputs 74 and 77 are each connected to an input of the AND-gate 70. The inputs 75 and 76 are each connected to an input of the AND-gate 71. The outputs of the two gates 70 and 71 are each connected to an input of the NOR-gate 72. If, subsequent to the closing of the two data time windows I(1) and O(1), the logic signals at the outputs Q and $\overline{Q}$ have different values, a logic 0 is developed at the output 78 of gate 62, to be applied to an enable input of gate 63. In the third phase state $T_3$, $\overline{Q}(50)=\overline{Q}(51)=0$ These signals are each applied to an enable input of gate 63. If a clock pluse is produced at the clock output 29 of the write counter 2, it is likewise fed to the signal inputs of gate 63 via line 44. In the aforesaid phase state $T_3$ this clock pulse is passed to the output 18 of gate 63, which is the output of comparator 17. With the aid of this pulse an emerency circuit can be activated. In the fourth phase state $T_4$, $Q(50)=0$ and $\overline{Q}(51)=0$. These signals are each applied to an enable input of gate 59. However, if a clock pulse is produced at the clock output 26 of the write counter 2, it is also applied to the signal input of gate 59 via line 64. In the aforesaid phase state $T_4$ this clock pulse is produced at the output of gate 59. With the aid of this clock pulse the two filpflops 60 and 61 are reset so as to have the four phase states start a new cycle.

For the elimination of the fixed delay time of the circuit, which is approximately 1 bit, the output data window can be opened and closed by means of the clock pulse produced at the second clock output 31 of the read counter 3. This is shown in FIG. 1 by means of a broken line, since the input 43 of the comparator 17 would then connected to this clock output 31.

What is claimed is:

1. A circuit for supervising a non-encoded serial binary bit stream which is produced on an output line of an elastic store in response to a non-encoded serial binary bit stream supplied on an input line to such store, the output bit stream having a bit rate differing from that of the input bit stream, said store comprising a memory having n successive bit storage locations; said circuit comprising:

a write register having successive outputs respectively coupled to the successive memory locations for supplying write clock pulses thereto at the input bit rate to write the successive bits in each group of n bits of the input bit stream respectively into the successive memory locations, each such stored group of bits having a parity which is odd or even dependent on whether the number of rising or falling edges of the bits therein is odd or even;

a read register having respective outputs coupled to the respective memory locations for supplying read clock pulses thereto at the output bit rate to read out to said output line the successive bits in each group of n bits stored in the successive memory locations; each such output group of bits having a parity which is odd or even dependent on whether the number of rising or falling edges of the bits therein is odd or even; the one of said registers having the higher clock pulse rate periodically interrupting the clock pulses produced thereby for an interval of one or more bit periods to equalize the numbers of bits written into and read from said memory between the successive interruptions; and:

a comparator having a first data input coupled to said input line to receive the input bit stream and having a second data input coupled to said output line to receive the output bit stream;

said comparator further having a first control input coupled to the output of the lower rate register which supplies clock pulses to the location in said memory in which the first bit in each of said groups of n bits is stored, a second control input coupled to the output of the higher rate register which supplies clock pulses to the location in said memory in which either the first or second bit in each of said groups of n bits is stored; and a third control input coupled to the output of the lower rate register which supplies clock pulses to the location in said memory in which the last bit in each of said groups of n bits is stored;

the clock pulses received at the first and third control inputs of said comparator opening a first time window during which the bits in the lower rate bit stream are received in said comparator, and the clock pulses at the second and third control inputs of said comparator opening a second time window during which the bits in the higher rate bit stream are received in said comparator, the first time window having a duration of n bits and the second time window having a duration of n bits plus the number of bit periods during which the higher rate clock pulses are interrupted;

said comparator comparing the parity of the bits received during said first time window with the parity of the bits received during said second time window and producing an output signal when such parities differ, such signal signifying an erroneous correspondence between said input bit stream and said output bit stream.

2. A supervisory circuit as claimed in claim 1, wherein the input bit stream has a lower rate than the output bit stream, said write register supplies write clock pulses to said memory at a lower rate than the read pulses supplied to said memory by said read register, said first and third control inputs of said comparator are respectively coupled to respective outputs of the write register, and said second control input of said comparator is coupled to an output of said read register.

* * * * *